E. G. GOFF.
ANIMAL POKE.
APPLICATION FILED JUNE 28, 1916. RENEWED MAR. 22, 1917.
1,241,842. Patented Oct. 2, 1917.
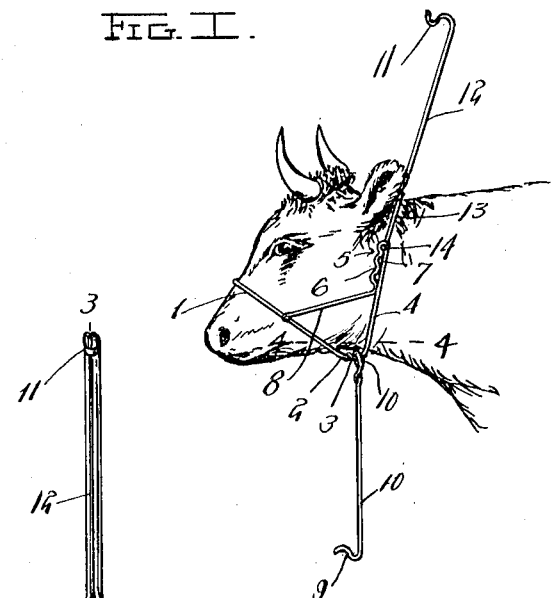
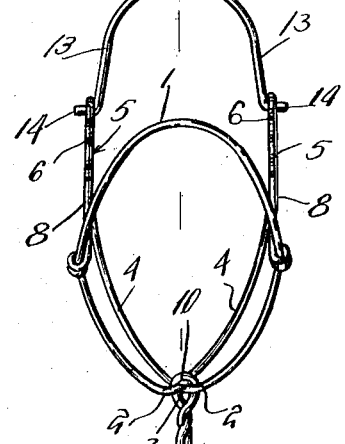
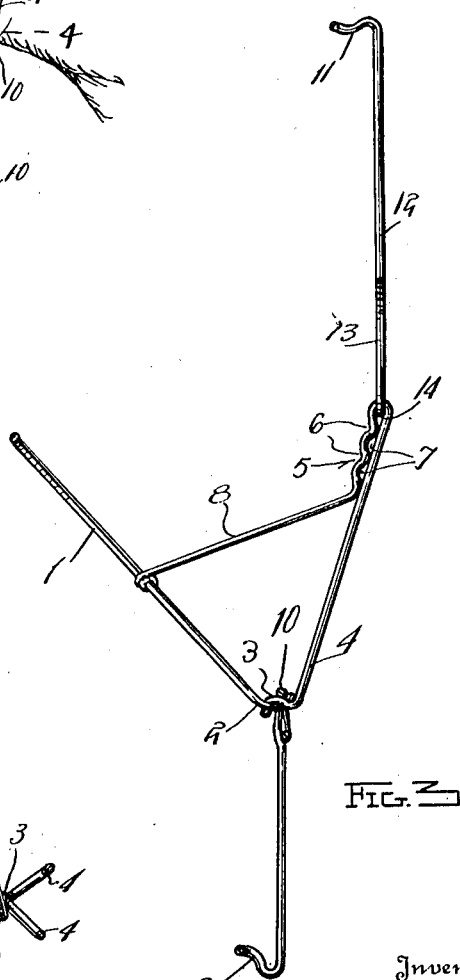
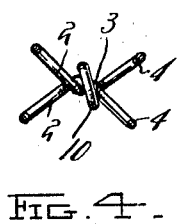
Inventor
E. G. Goff

UNITED STATES PATENT OFFICE.

EDGAR G. GOFF, OF CHATTANOOGA, OKLAHOMA.

ANIMAL-POKE.

1,241,842.   Specification of Letters Patent.   Patented Oct. 2, 1917.

Application filed June 28, 1916, Serial No. 106,429.   Renewed March 22, 1917.   Serial No. 156,739.

*To all whom it may concern:*

Be it known that I, EDGAR G. GOFF, a citizen of the United States, residing at Chattanooga, in the county of Comanche, State of Oklahoma, have invented certain new and useful Improvements in Animal-Pokes; and I do hereby declare the following to be a full, clear, and exact description of the invention, such as will enable others skilled in the art to which it appertains to make and use the same.

The invention is directed to improvements in animal pokes, and has for its object to provide a device of this character which is formed from suitable metal and constructed in such a manner that the animal will be prevented from passing between or over the line wires of a fence.

A further object of the invention is to provide a device of this character which is exceedingly simple in construction and so constructed that the same can be conveniently adjusted to fit animals of different sizes.

With these and other objects in view, this invention resides in the novel features of construction, formation, combination, and arrangement of parts to be hereinafter more fully described, claimed and illustrated in the accompanying drawing, in which:—

Figure 1 is a side elevation of the device.

Fig. 2 is a front view.

Fig. 3 is a sectional view on line 3—3 of Fig. 2.

Fig. 4 is a sectional view on line 4—4 of Fig. 1.

Referring to the drawing 1 indicates a frame, which is adapted to engage around the nose of the animal, said frame being elongated and has the rear ends of its bars 2 twisted together, as at 3, said bars terminating beyond the twists in upwardly and forwardly inclined arms 4. The arms terminate in bars 5, said bars being provided with vertically spaced depressions 6 which form sockets 7 in conjunction with the arms 4, the purpose of which will appear later.

The lower ends of the bars 5 terminate in downwardly inclined arms 8 which have their lower ends secured to the bars 2 of the frame 1 and serve to brace the arms 4.

A hook 9 is provided and is formed from a single length of suitable metal which is bent upon itself and is provided with central coils 10 which are adapted to pivotally engage the twisted parts 3.

A hook 11 is employed and is also formed from a single length of suitable metal, said hook having its shank 12 terminating in oppositely disposed curved arms 13, the lower ends of which are provided with extensions 14, said extensions being adapted to detachably engage one of the sockets 7. Since the arms 13 are formed from metal it is obvious that the same can be forced toward each other so that the extensions 14 can be disengaged from one pair of sockets and engaged in another pair, whereby the hook 11 will be adjusted vertically as well as the arms 13 which engage around the neck of the animal.

From the foregoing description it will be seen that the hooks 9 and 11 will be so positioned that should the animal attempt to pass through a restricted passage the hooks will engage the walls of the passage and will prevent the animal from passing therethrough.

What is claimed is:—

An animal poke comprising a frame, said frame having its side bars twisted together at their rear ends and terminating in forwardly inclined arms, said arms terminating in downwardly directed bars having depressions formed therein, said bars terminating in arms which have their lower ends connected to the bars of the frame, a hook pivotally connected with the frame, a second hook having its shank terminating in curved arms, extensions carried by the lower ends of the last named arms, said extensions being adapted to selectively engage said depressions, as and for the purpose set forth.

In testimony whereof, I affix my signature, in the presence of two witnesses.

EDGAR G. GOFF.

Witnesses:
E. A. MARTIN,
A. J. LAURIE.

Copies of this patent may be obtained for five cents each, by addressing the "Commissioner of Patents, Washington, D. C."